(12) United States Patent
Ray et al.

(10) Patent No.: US 9,384,238 B2
(45) Date of Patent: Jul. 5, 2016

(54) BLOCK PARTITIONING FOR EFFICIENT RECORD PROCESSING IN PARALLEL COMPUTING ENVIRONMENT

(71) Applicant: Wal-Mart Stores, Inc., Bentonville, AR (US)

(72) Inventors: Andrew Benjamin Ray, Bentonville, AR (US); Nathaniel Philip Troutman, Seattle, WA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 475 days.

(21) Appl. No.: 13/871,847

(22) Filed: Apr. 26, 2013

(65) Prior Publication Data

US 2014/0324861 A1 Oct. 30, 2014

(51) Int. Cl.
*G06F 17/30* (2006.01)

(52) U.S. Cl.
CPC .................................. *G06F 17/30442* (2013.01)

(58) Field of Classification Search
CPC .................. G06F 3/064; G06F 3/0644; G06F 2212/1044; G06F 17/30442
USPC .................. 707/737, E17.014, 692, E17.005, 707/E17.046, 741, 722, 769, 791, 792, 707/999.005, E17.001, E17.002, E17.044, 707/E17.045, E17.048, E17.051, E17.054, 707/E17.055, E17.083, 690, 695, 718, 747, 707/752, 780, 796, 797, 809, 822, 827, 707/999.002, 999.003, 999.102; 709/224, 709/215, 226; 706/12, 46, 48, 52
See application file for complete search history.

(56) References Cited

U.S. PATENT DOCUMENTS

| | | | |
|---|---|---|---|
| 5,710,915 A * | 1/1998 | McElhiney | |
| 6,978,458 B1 * | 12/2005 | Ghosh et al. | .................. 718/100 |
| 7,549,052 B2 | 6/2009 | Haitsma | |
| 8,364,677 B2 | 1/2013 | Brodfuehrer | |
| 2004/0215640 A1 * | 10/2004 | Bamford et al. | .............. 707/100 |
| 2013/0212103 A1 * | 8/2013 | Cao et al. | ...................... 707/737 |

* cited by examiner

*Primary Examiner* — Jay Morrison
*Assistant Examiner* — Ken Hoang
(74) *Attorney, Agent, or Firm* — Bryan Cave LLP (57) ABSTRACT

A computer-implemented method is disclosed for efficiently processing a large number of records. In the method, a computer system may obtain a plurality of records and count the number of records thereof corresponding to each block of a plurality of blocks. The computer system may also identify a plurality of partitions corresponding to selected blocks of the plurality of blocks. Each partition of the plurality of partitions may be substantially uniform in processing time. The computer system may then distribute a workload associated with a block or partition to each node of a plurality of nodes contained within the computer system. Each node may then process the block or partition in parallel such that each node completes the processing within a selected period of time.

21 Claims, 7 Drawing Sheets

BLOCK PARTITIONING FOR EFFICIENT RECORD PROCESSING IN PARALLEL COMPUTING ENVIRONMENT

BACKGROUND

1. Field of the Invention

This invention relates to computerized record processing systems and more particularly to systems and methods for partitioning blocks of records in order to efficiently use distributed computing resources.

2. Background of the Invention

The computation time required for certain types of record processing increases rapidly as the number of records increases. For example, record linkage requires comparing pairs of records. Each such comparison is computationally expensive. Additionally, as the number records increases, the number of comparisons that need to be conducted grows exponentially. Accordingly, what is needed is a computer system configured to efficiently process large numbers of records.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
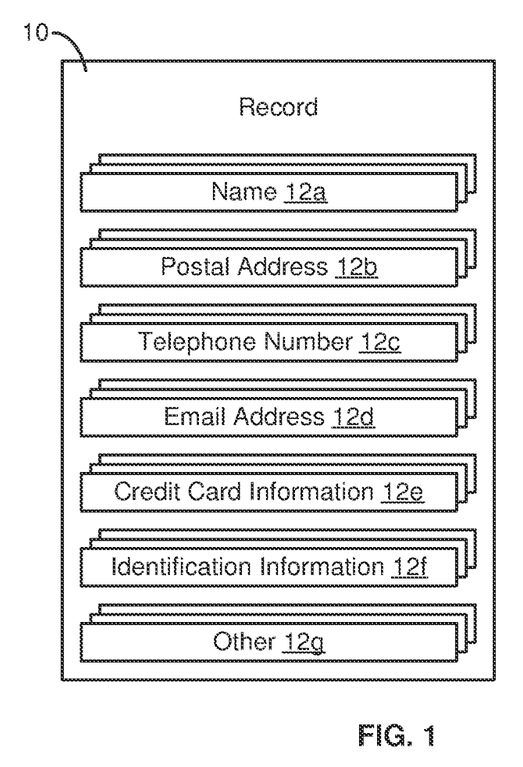
FIG. 1 is a schematic block diagram of one embodiment of a computer record in accordance with the present invention.

Referring to FIG. 1, computerized records 10 processed in accordance with the present invention may have any suitable form or content. In selected embodiments, records 10 may correspond to the activities of a business, information related to a business, activities of customers of one or more businesses, information related to customers of one or more businesses, or the like or a combination or sub-combination thereof. For example, records 10 may correspond to or comprise customer profiles.

A computerized record 10 may include or contain one or more fields 12 or members 12. The nature of the fields 12 may correspond to the nature or purpose of a record. For example, a record 10 that is embodied as a customer profile may include one or more fields 12 populated with contact information, demographic information, geographic information, and psychographic characteristics, buying patterns, creditworthiness, purchase history, or the like or a combination or sub-combination thereof. Accordingly, in selected embodiments, a record 10 may include or contain fields 12 populated with one or more names 12$a$, postal addresses 12$b$, telephone numbers 12$c$, email addresses 12$d$, credit card information 12$e$ (e.g., codes or index information corresponding to credit card data), identification information 12$f$ (e.g., account numbers, customer numbers, membership numbers, or the like), other information 12$g$ as desired or necessary, or the like.

Records 10 in accordance with the present invention may be processed in any suitable manner. In selected embodiments, it may be desirable to identify one or more links between two or more records 10. For example, records 10 corresponding to customer profiles may be generated by different sources. Accordingly, records 10 may be compared to identify those that correspond to the same individual, household, or the like. Such records 10 may then be linked, enabling greater benefit to be obtained thereby.

For example, certain records 10 may correspond to online purchases. Other records 10 may correspond to membership in a warehouse club. Still other records 10 may correspond to purchases in a brick-and-mortar retail store. Selected customers and/or households may correspond to records 10 from one or more such sources. However, there may not be any hard link (e.g., unifying or universal identification number) linking such records 10 together. Accordingly, fuzzy logic may be used to identify those records 10 that correspond to the same individual, household, or the like. Once linked together, those records 10 may provide a more complete picture of the individual or household and, as a result, be more useful.

Figure 2:
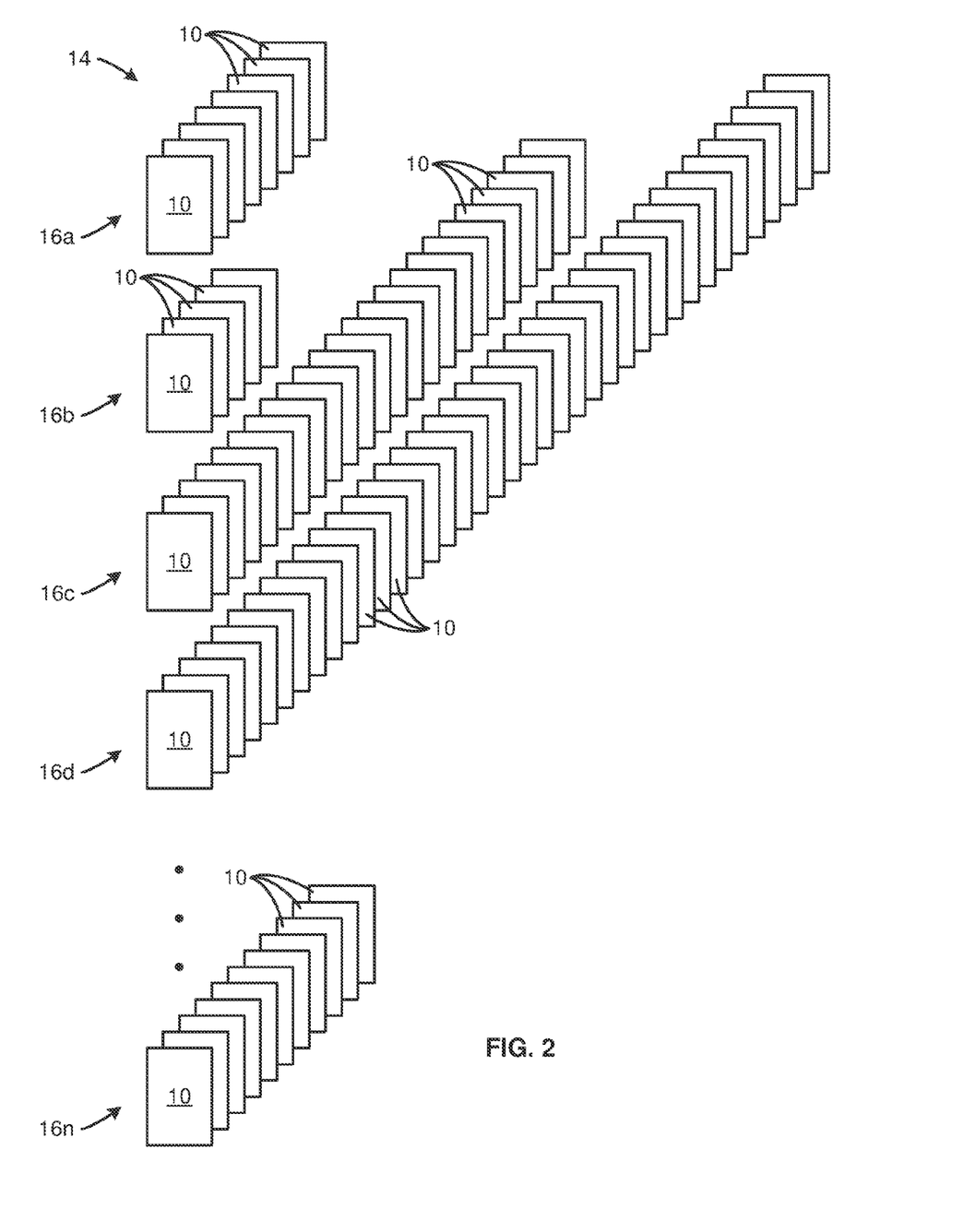
FIG. 2 is a schematic block diagram showing a plurality of records divided into a plurality of blocks in accordance with the present invention.

Referring to FIG. 2, in selected embodiments, linking two or more records 10 together may require comparing pairs of records 10. As the number records 10 increases, the number of comparisons grows exponentially. Moreover, each comparison of two records 10 may be computationally expensive. Accordingly, systems in accordance with the present invention may employ new methodologies in order to efficiently process one or more large collections 14 of records 10 (e.g., collections 14 of over one million records 10, five hundred million records 10, one billion records 10, or the like).

In certain embodiments, a system in accordance with the present invention may control the number of comparisons by "blocking" (i.e., separating a collection 14 of records 10 from one or more sources into a plurality of blocks 16). Blocking may include assigning a key to each record 10 based on one or more attributes thereof. For example, if each record 10 of a collection 14 corresponds to or comprises a customer profile, blocking may comprise assigning a key to each record 10 based on customer attributes such as zip code and first letter of last name. Comparisons may then only be made between records 10 corresponding to the same block 16, thereby reducing the total number of comparisons that need to be performed.

Since comparisons between records 10 are independent (e.g., can be conducted without inter-process communication), record linkage in accordance with the present invention may be performed in a parallel computing environment. Unfortunately, the blocks 16 produced in a blocking process may not be uniform in size. For example, a block 16d corresponding to downtown San Francisco may be much larger than a block 16b corresponding to rural Montana. If left unchecked, variations in the size (i.e., number of records 10) of the blocks 16 may lead to imbalances in resource utilization within a parallel computing environment.

That is, in a simple parallelization arrangement, each processor or computing resource may be responsible for a single block 16. Due to variation in size of the blocks 16, many processors or computing resources may complete their work and then sit idle, waiting for a few very large blocks 16 (e.g., block 16d) to finish processing. Since the number of comparisons in a block 16 is proportion to the square of the number of records 10 with the block 16, even small changes in the size of a block 16 may cause very large changes in the required processing time.

Figure 3:
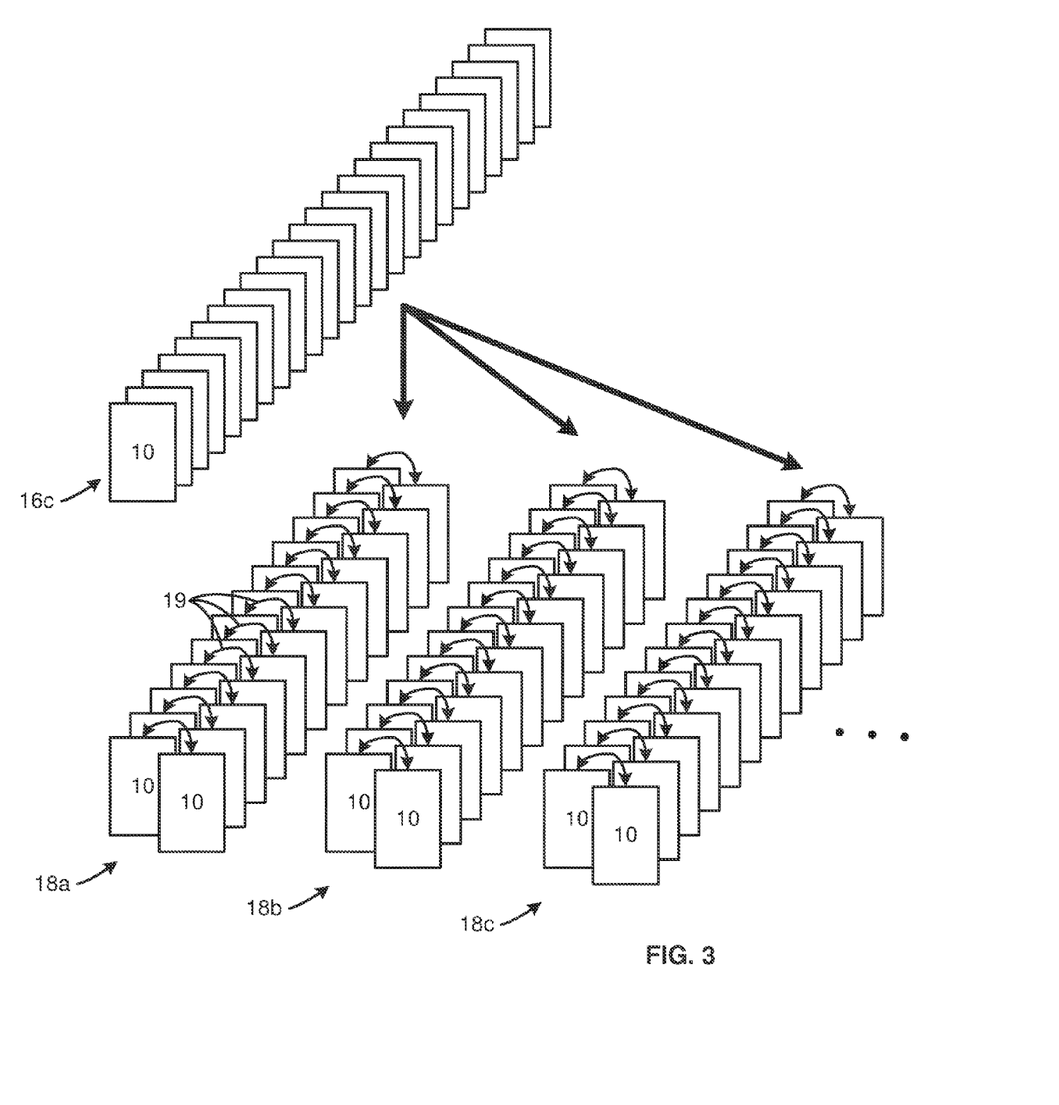
FIG. 3 is a schematic block diagram showing one block of records being partitioned in accordance with the present invention.

Referring to FIG. 3, to more efficiently utilize computing resources in a parallel computing environment, systems in accordance with the present invention may employ "block partitioning." In block partitioning, the processing associated with one or more larger blocks 16 (e.g., blocks 16c, 16d or the like) may be divided into a plurality of partitions 18. The processing associated with smaller blocks 16 and partitions 18 of larger blocks 16 may then be distributed within a parallel computing environment. Block partitioning may result in a more even workload being assigned to the processors or computing resources. Accordingly, the processors or computing resources may complete their respective work at approximately the same time, producing a more efficient utilization of resources.

Partitions 18 may be defined in any suitable manner. In selected embodiments, partitions 18 may be defined in accordance with the processing to be conducted. For example, in record linkage, each record 10 within a particular block 16 may be compared against every other record 10 within that block 16. The order of progression of these comparisons 19 may be set or known in advance. Accordingly, a pre-set order of comparison may be used when delineating partitions 18.

For example, in selected embodiments, the order of comparison may begin with a first record 10 being compared to a second record 10, then to a third record 10, then to a fourth record, etc. until the first record 10 has been compared sequentially to each record 10 within the block 16. Thereafter, the second record 10 may be compared to the third record 10, then to the fourth record 10, then to a fifth record 10, etc. until the second record 10 has been compared sequentially to each record 10 within the block 16. This pattern or order may be followed until all possible comparisons 19 between the records 10 of the block 16 have been made.

In such embodiments, partitions 18 may correspond not to specific records 10, but rather to specific comparisons 19 between records 10. Accordingly, a first partition 18a may correspond to a first set of comparisons 19 (e.g., comparisons 19 arranged "1" through "n" in the pre-set order), a second partition 18b may correspond to a second set of comparisons 19 (e.g., comparisons 19 arranged "n+1" through "2n" in the pre-set order), a third partition 18c may correspond to a third set of comparisons 19 (e.g., comparisons 19 arranged "2n+1" through "3n" in the pre-set order), and so forth.

In selected embodiments, record linkage using block partitioning may be performed in two passes through a parallel computing environment. A first pass may simply identify the possible blocks 16 and count the total number of records 10 corresponding to those blocks 16. This may be a relatively fast process, with the end result being a list identifying the blocks 16 that are too large.

The determination of what constitutes a large block 16 may be based on one or more factors. In different embodiments, situations, or applications, different factors may drive the decision of how to define a large block 16. For example, in selected embodiments, the definition of a large block 16 may be based on a determination of how long it takes to compare two records 10 and a determination of how much time will be allowed for the various processors or computing resources to complete their work. Using those two pieces of information, a system or a system architect may calculate the maximum size (e.g., maximum number of records 10) of an unpartitioned block 16. All blocks 16 have a size greater than that maximum may be considered to be large blocks 16 eligible for block partitioning in accordance with the present invention.

In a second pass through a parallel computing environment, a list identifying the large blocks 16 may be used to determine how the large blocks 16 are to be partitioned. Typically, the goal may be to generate partitions 18 that are of approximately uniform size and will, therefore, require approximately the same processing time. In selected embodiments, a system may comprise or be a parallel computing system (e.g., a massive parallel computing system comprising hundreds of machines) without inter-process communication. Accordingly, the system may actually modify the blocks that are generated.

For example, in certain embodiments, when each record 10 is first processed (e.g., in a first pass), a system may generate tuples comprising or identifying a block key and a corresponding record 10. Records 10 may then be grouped based on the block keys assigned thereto. In a second pass, a system may take the block keys corresponding to large blocks 16 and generate not one tuple per key, but multiple tuples per key. The number of tuples may be based on the number of partitions 18 needed for the corresponding block 16. Each such tuple may be a concatenation of a block key, a number of partitions in the block 16, and an index identifying the partition 18 to which the corresponding record 10 pertains.

Subsequently, each record 10 corresponding to the same unpartitioned block 16 may be sent to the same processor or computing resource for processing. Similarly, each record 10 corresponding to the same partition 18 of the same large block 16 may be sent to the same processor or computing resource for processing. The processing (e.g., comparison) may then be performed by the various processors or computing resources. Due to block partitioning, work may be better distributed across the processors or computing resources of a parallel computing environment, resulting in a more efficient utilization of resources and a reducing total run-time.

Figure 4:
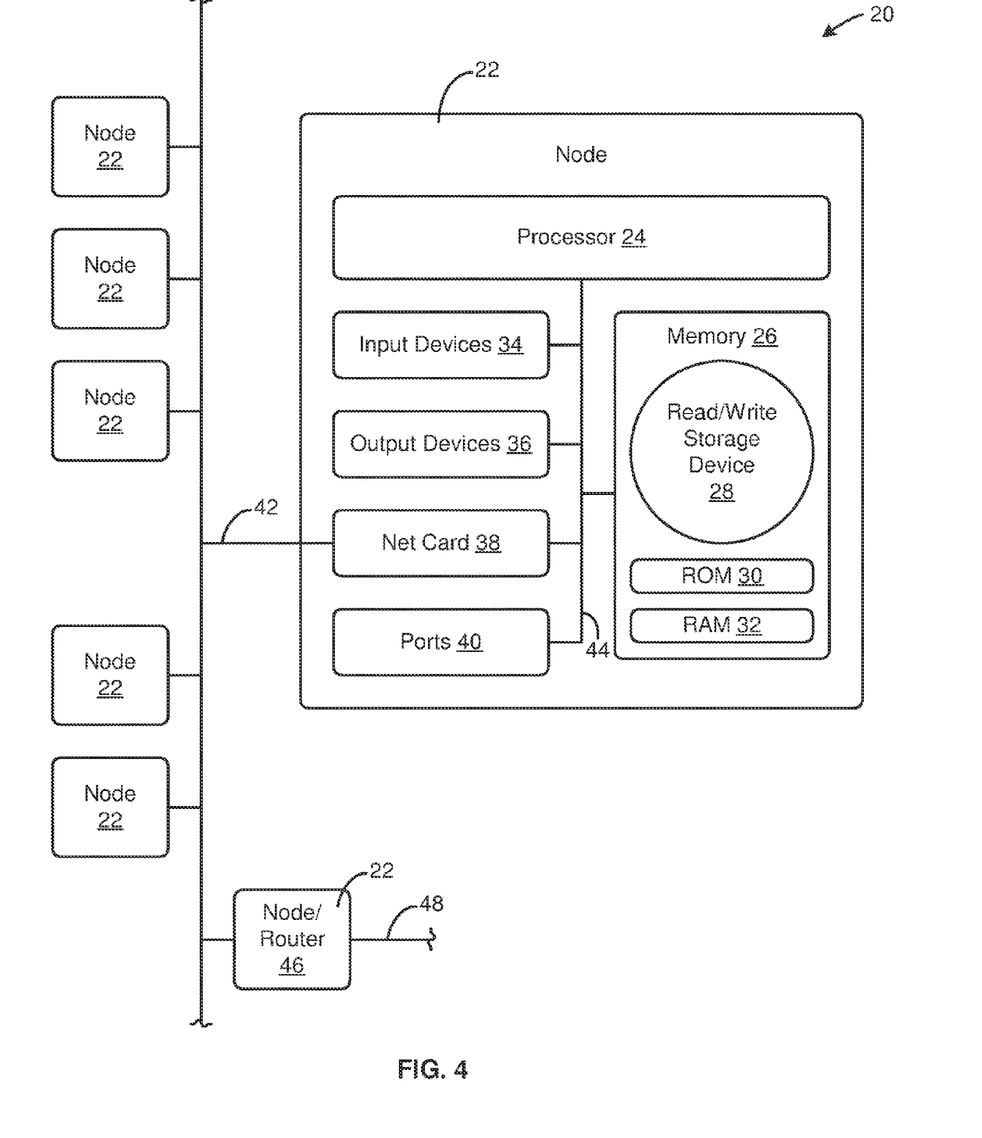
FIG. 4 is a schematic block diagram of one embodiment of a computer system in accordance with the present invention.

Referring to FIG. 4, a system 20 in accordance with the present invention may provide, enable, or support blocking, block partitioning, parallelization, or the like or a combination thereof in any suitable manner. In certain embodiments, a system 20 may be embodied as hardware, software, or some combination thereof. For example, in selected embodiments, a system 20 may include one or more nodes 22.

A node 22 may include one or more processors 24, processor cores 24, or central processing units (CPUs) 24 (hereinafter "processors 24"). Each such processor 24 may be viewed an independent computing resource capable of performing a processing workload distributed thereto. Alternatively, the one or more processors 24 of a node 22 may collectively form a single computing resource. Accordingly, individual workload shares (e.g., blocks 16, partitions 18 of blocks 16) may be distributed to nodes 22, to multiple processors 24 of nodes 22, or combinations thereof.

In selected embodiments, a node 22 may include memory 26. Such memory 26 may be operably connected to a processor 24 and include one or more devices such as a hard drive 28 or other non-volatile storage device 28, read-only memory (ROM) 30, random access memory (RAM) 32, or the like or a combination or sub-combination thereof. In selected embodiments, such components 24, 26, 28, 30, 32 may exist in a single node 22. Alternatively, such components 24, 26, 28, 30, 32 may be distributed across multiple nodes 22.

In selected embodiments, a node 22 may include one or more input devices 34 such as a keyboard, mouse, touch screen, scanner, memory device, communication line, and the like. A node 22 may also include one or more output devices 36 such as a monitor, output screen, printer, memory device, and the like. A node 22 may include a network card 38, port 40, or the like to facilitate communication through a computer network 42. Internally, one or more busses 44 may operably interconnect various components 24, 26, 34, 36, 38, 40 of a node 22 to provide communication therebetween. In certain embodiments, various nodes 22 of a system 10 may contain more or less of the components 24, 26, 34, 36, 38, 40, 44 described hereinabove.

Different nodes 22 within a system 20 may perform difference functions. For example, one or more nodes 22 within a system 20 may function as or be master nodes 22. Additionally, one or more nodes 22 within a system 20 may function as or be worker nodes 22. Accordingly, a system 20 may include one or more master nodes 22 distributing work to one or more worker nodes 22. In selected embodiments, a system 20 may also include one or more nodes 22 that function as or are routers 46 and the like. Accordingly, one computer network 42 may be connected to other computer networks 48 via one or more routers 46.

Figure 5:
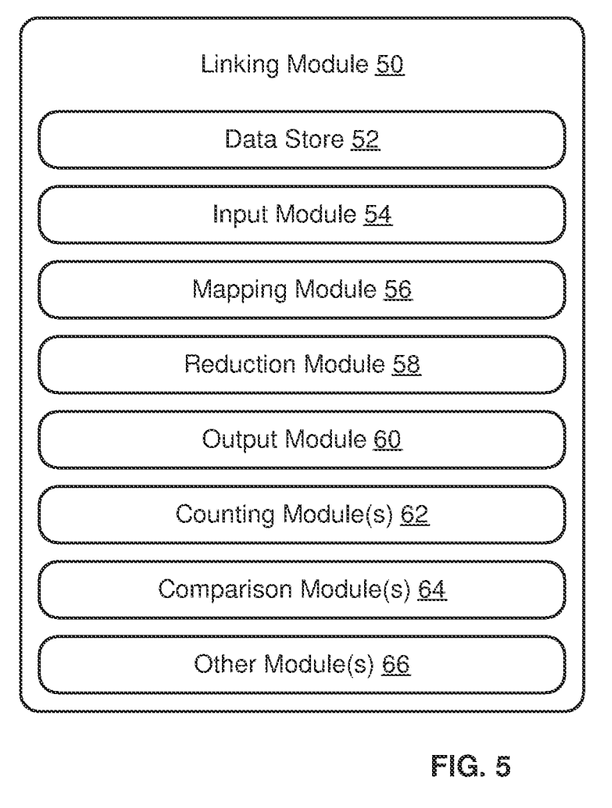
FIG. 5 is a schematic block diagram of one embodiment of a linking module in accordance with the present invention.

Referring to FIG. 5, a system 20 in accordance with the present invention may process records 10 in any suitable manner. In selected embodiments, the nature of the hardware and/or software of a system 20 may reflect the specific processing to be performed. For example, a system 20 configured to link records 10 may include a linking module 50 providing, enabling, or supporting such functionality.

A linking module 50 in accordance with the present invention may include any suitable arrangement of sub-components or modules. In certain embodiments, a linking module 50 may include a data store 52, input module 54, mapping module 56, reduction module 58, output module 60, counting module 62, comparison module 64, one or more other modules 66 as desired or necessary, or the like or some combination or sub-combination thereof.

In selected embodiments, certain components or modules of a linking module 50 may be associated more with nodes 22 of a certain type. For example, a data store 52, input module 54, mapping module 56, reduction module 58, and output module 60 may be primarily or exclusively associated with one or more master nodes 22. Conversely, a counting module 62 and comparison module 64 may be primarily or exclusively associated with one or more worker nodes 22.

A data store 52 may contain information supporting the operation of a linking module 50. In selected embodiments, a data store 52 may contain or store one or more records 10. For example, a data store 52 may contain one or more records 10 comprising customer profiles from one or more sources. A data store 52 may also contain data, information, results, or the like produced by a linking module 50 or one or more components or modules thereof. For example, a data store 52 may contain a list of blocks 16 that have been determined to be large and suitable for partitioning. A data store 52 may also contain linking information identifying which records 10 correspond to the same individual, household, or the like.

An input module 54 may generate, collect, extract, receive, communicate, and/or process any inputs (e.g., instructions, information, etc.) needed or used by a linking module 50. For example, an input module 54 may receive a command or instruction to begin processing records 10. Accordingly, in selected embodiments, an input module 54 may be responsible for initiating a linking analysis or process. Alternatively, or in addition thereto, an input module 54 may collect, receive, extract, or communicate one or more records 10 that may be used or processed by one or more other components or modules of a linking module 50.

A mapping module 56 may control the flow of instructions, records 10, keys, or the like or combinations or sub-combinations thereof from one or more master nodes 22 to one or more worker nodes 22. For example, a mapping module 56 may take an appropriate input, divide it into smaller sub-problems, and distribute the sub-problems to a plurality of worker nodes 22. In selected embodiments, a mapping module 56 may enable one or more worker nodes 22 to take an input, divide it into still smaller sub-problems, and distribute them to still other worker nodes 22, leading to a multi-level tree structure.

A mapping module 56 may correspond to, enable, or support one or more passes through a parallel computing environment. For example, in selected embodiments, a mapping module 56 may enable or support a first pass through a parallel computing environment wherein the possible blocks 16 are identified and the total number of records 10 corresponding to those blocks 16 are counted. The mapping module 56 may also enable or support the sending of records 10 corresponding to the same partition 18 of the same large block 16 to the same processor or computing resource for processing. Alternatively, a linking module 50 may be constructed with multiple mapping modules 56. Accordingly, different mapping modules 56 may correspond to different passes through a parallel computing environment.

Once the various worker nodes 22 have finished processing their respective workloads, the results may be passed back to one or more master nodes 22. This process may be controlled or facilitated by a reduction module 58. Alternatively, or in addition thereto, a reduction module 58 may control the assimilation or reduction of the results produced by one or more worker nodes 22. That is, a reduction module 58 may collect the answers to all the various sub-problems and combine them in some way to form a desired output.

As with a mapping module 56, a reduction module 58 may correspond to, enable, or support one or more passes through a parallel computing environment. For example, in selected embodiments, a reduction module 58 may enable or support first and second passes through a parallel computing environment. Alternatively, a linking module 50 may be constructed with multiple reduction modules 58. Accordingly, different reduction modules 58 may correspond to different passes through a parallel computing environment.

An output module 60 may generate, collect, compile, send, communicate, and/or process any outputs of a linking module 50. For example, in selected embodiments, an output module 60 may receive linking information (e.g., from an reduction module 58), pass linking information to a data store 52 for storage, modify one or more records 10 in accordance with linking information, or the like or a combination or subcombination thereof.

A counting module 62 may correspond to, enable, or support the processing of one or more records 10 in any suitable manner. In selected embodiments, a counting module 62 may enable or support the processing corresponding to a first pass through a parallel computing environment. For example, a counting module 62 may enable one or more worker nodes 22 to identify the possible blocks 16 contained within a collection 14 of records 10 and count the total number of records 10 corresponding to those blocks 16. A counting module 62 may enable or support (e.g., provide information used to create) a list identifying the blocks 16 that are large.

In selected embodiments, a linking module 50 may correspond to or include multiple counting modules 62. For example, in a parallel computing environment, a plurality of worker nodes 22 may each correspond to, enable, or support a counting module 62. Accordingly, the number of counting modules 62 may correspond to or match the number of worker nodes 22.

A comparison module 64 may correspond to, enable, or support the processing of one or more records 10 in any suitable manner. In selected embodiments, a comparison module 64 may enable or support the processing corresponding to a second pass through a parallel computing environment. For example, a comparison module 64 may enable one or more worker nodes 22 to compare the records 10 of a particular group amongst themselves and use fuzzy logic to identify records 10 that correspond to the same individual, household, or the like.

As with a counting module 62, a linking module 50 may correspond to or include multiple comparison modules 64. For example, in a parallel computing environment, a plurality of worker nodes 22 may each correspond to, enable, or support a comparison module 64. Accordingly, the number of comparison modules 64 may correspond to or match the number of worker nodes 22.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on one or more master nodes 22, worker nodes 22, or combinations thereof. In selected embodiments, one or more master and/or nodes 22 may be positioned remotely with respect to one another. Accordingly, such nodes 22 may be connected to one another through any type of network, including a local area network (LAN) or a wide area network (WAN), or the connection may be made through the Internet using an Internet Service Provider.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Selected embodiments in accordance with the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 6:
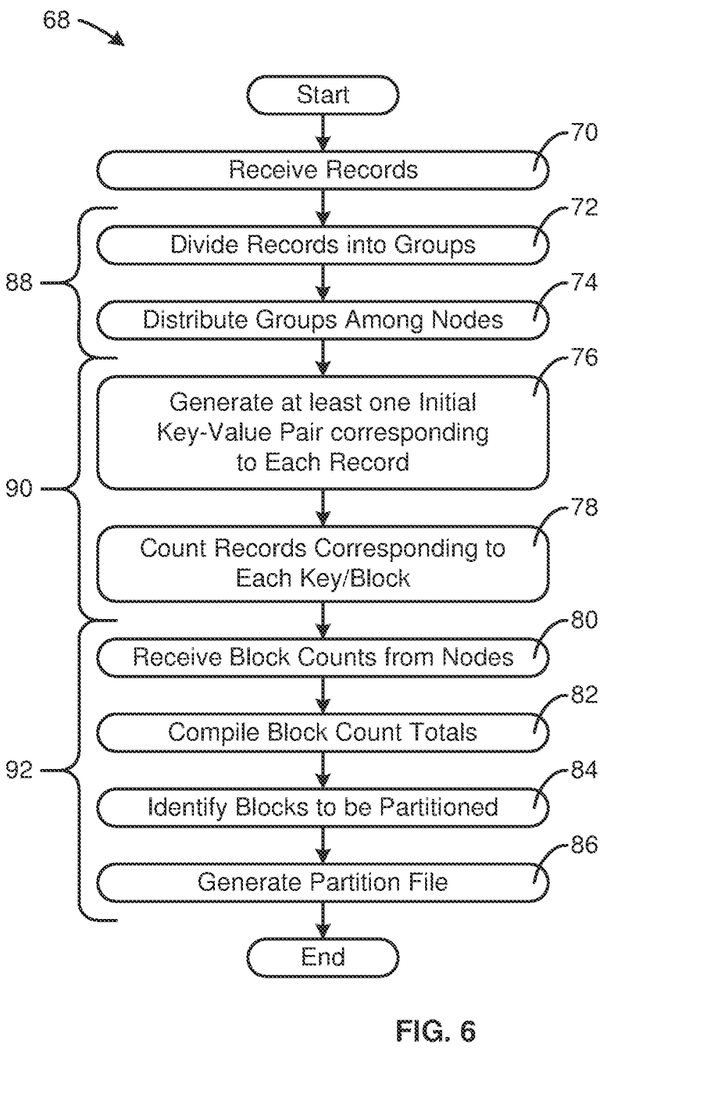
FIG. 6 is a schematic block diagram of one embodiment of a method corresponding to a first pass through a parallel computing environment in accordance with the present invention.

Referring to FIG. 6, in selected embodiments, a method 68 corresponding to a first pass through a parallel computing environment may begin when a collection 14 of records 10 (or access thereto) is obtained or received 70 by a system 20 in accordance with the present invention. Sometime subsequent thereto, the collection 14 of records 10 may be divided 72 into groups and distributed 74 among a plurality of nodes 22 for processing. Accordingly, the number of groups may correspond to the number of worker nodes 22 that are to process the first pass.

The processing conducted as part of a first pass through a parallel computing environment may include generating 76 at least one initial key-value pair corresponding to each record 10. In selected embodiments, an initial key-value pair may comprise a key identifying a block 16 (e.g., identifying the zip code and first letter of last name or the like that defines a block 16) and a value comprising, corresponding to, or identifying a record 10 or one or more fields 12 thereof. Accordingly, generating 76 a key-value pair for each record 10 may include identifying at least one block 16 to which each record 10 of the collection 14 pertains.

The method 68 may continue with or also include a count 78 of the number of records 10 corresponding to each block 16 or associated key. In selected embodiments, such a count 78 may be conducted on a group-by-group basis by the worker nodes 22 assigned to perform that function. Accordingly, separate block counts may be received 80 by one or more master nodes 22 from the worker nodes 22. These separate block counts may then be compiled 82, reduced, or the like to determine the total number of records 10 corresponding to each block 16.

Using the totals for each block 16, one or more blocks 16 suitable for partitioning may be identified 84. Accordingly, a partition file may be generated 86. In selected embodiments, a partition file may identify the blocks 16 that are in need of partitioning. A partition file may also identify the size (e.g., number of records 10) of such blocks 16.

The functionality associated with a first pass through a parallel computing environment may be performed by any suitable components, modules, combinations of modules, or the like of a linking module 50. In selected embodiments, a first group 88 of steps or functions may correspond primarily to a mapping module 56, a second group 90 of steps or functions may correspond primarily to a plurality of counting modules 62, and a third group 92 of steps or functions may correspond primarily to a reduction module 58.

Figure 7:
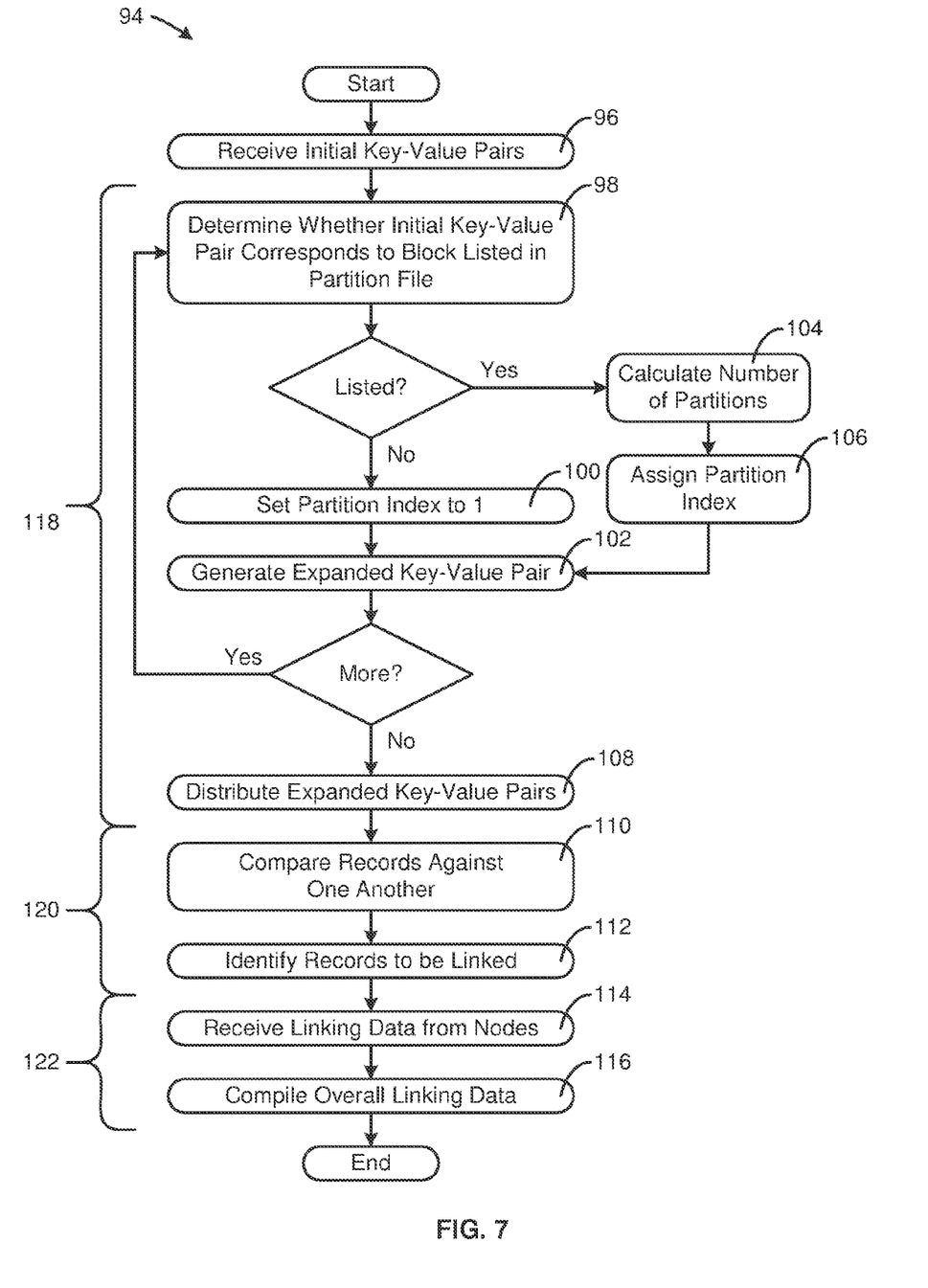
FIG. 7 is a schematic block diagram of one embodiment of a method corresponding to a second pass through a parallel computing environment in accordance with the present invention.

Referring to FIG. 7, in selected embodiments, a method 94 corresponding to a second pass through a parallel computing environment may begin when a collection 14 of initial key-value pairs (or access thereto) is obtained or received 96 by a system 20 in accordance with the present invention. Sometime subsequent thereto, a system 20 may determine 98 whether an initial key-value pair corresponds to a block 16 listed within a partition file (i.e., corresponds to a block 16 in need of partitioning).

If the initial key-value pair corresponds to a block 16 that is not listed, a system 20 may simply assign 100 a partition index of "1" and generate 102 an expanded key-value pair. Accordingly, all records 10 corresponding to that block 16 may be processed as one partition 18. Conversely, if the initial key-value pair corresponds to a block 16 that is listed, a system 20 may use the block size listed in a partition file to calculate 104 the number of partitions 18 needed, assign 106 an appropriate partition index, and then generate 102 an expanded key-value pair.

In certain embodiments, a partition index may be a number identifying a particular partition 18 to which a corresponding record 10 pertains. Accordingly, if the processing associated with a particular block 16 were to be divided into four partitions 18, then an assigned 106 partition index may be "1," "2," "3," or "4." That is, a partition index of "1" may indicate a correspondence with a first fourth of the comparisons 19 (or there about) for the associated block 16, a partition index of "2" may indicate a correspondence with a second fourth of the comparisons 19 (or there about) for the associated block 16, and so forth.

An expanded key-value pair in accordance with the present invention may contain or communicate any information that is desired or necessary. In selected embodiments, each key of an expanded key-value pair may include an identification of a corresponding block 16, an identification of the number of partitions 18 corresponding to the block 16, and a partition index. Each value of an expanded key-value pair may comprise, correspond to, or identify a record 10 or one or more fields 12 thereof. Accordingly, an expanded key-value pair may resemble an initial key-value pair, but contain some additional data required by a second pass through a parallel computing environment.

The steps leading to the generation 102 of an expanded key-value pair may proceed in any suitable manner. In selected embodiments, the initial key-value pairs may be processed in series, parallel, or some combination thereof until all the necessary expanded key-value pairs have been generated 102. Accordingly, the steps leading to the generation 102 of an expanded key-value pair may be iterated or repeated as necessary to accomplish the desired objective.

At some point, expanded key-value pairs may be sorted (e.g., sorted by key) and distributed 108 among a plurality of nodes 22 for processing. The expanded key-value pairs that share the same key may be sent to the same worker nodes 22. Accordingly, the worker nodes 22 may compare 110 the appropriate records 10 against one another and identify 112 records 10 that pertain to the same individuals or households and should be linked together.

In selected embodiments, such comparisons 110 may be completed on a block-by-block and/or partition-by-partition basis by the worker nodes 22 assigned to perform that function. Accordingly, separate linking data may be received 114 by one or more master nodes 22 from the worker nodes 22. This separate linking data may then be compiled 116, reduced, or the like to determine the overall linking data corresponding to the whole collection 14 of records 10.

The functionality associated with a second pass through a parallel computing environment may be performed by any suitable components, modules, combinations of modules, or the like of a linking module 50. In selected embodiments, a first group 118 of steps or functions may correspond primarily to a mapping module 56, a second group 120 of steps or functions may correspond primarily to a plurality of comparison modules 62, and a third group 122 of steps or functions may correspond primarily to a reduction module 58.

The flowcharts in FIGS. 6 and 7 illustrate the architecture, functionality, and operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method for efficiently processing a large number of records, the method comprising:
    obtaining, by a computer system, a plurality of records;
    generating a plurality of tuples, each tuple of the plurality of tuples identifying a block key of a plurality of block keys and a corresponding record of the plurality of records;
    grouping portions of the plurality of records into a plurality of blocks according to the plurality of block keys;
    counting, by the computer system, a number of records of the plurality of records corresponding to each block of the plurality of blocks;
    identifying, by the computer system, a plurality of partitions corresponding to selected blocks of the plurality of blocks, each partition of the plurality of partitions being substantially uniform in processing time such that each partition of the plurality of partitions completes processing within a selected period of time, the identifying comprises:
        identifying, by the computer system, the plurality of partitions corresponding to the selected blocks of the plurality of blocks that contain a disproportionally large number of records of the plurality of records, such that the disproportionally large number of records of the plurality of records is determined by calculating a maximum size of an unpartitioned block of the plurality of blocks by:
            determining a comparison time to compare two records of the plurality of records; and
            determining a threshold time allowed for a processor of the computer system to complete the processing;
    distributing, by the computer system, a workload associated with a block of the plurality of blocks or a partition of the plurality of partitions to each node of a plurality of nodes contained within the computer system; and
    processing, in parallel by each node of the plurality of nodes, the workload associated with the block of the plurality of blocks or the partition of the plurality of partitions.

2. The method of claim 1, wherein the processing comprises comparing records corresponding to the block of the plurality of blocks or the partition of the plurality of partitions.

3. The method of claim 1, wherein the processing further comprises searching for links between records corresponding to the block of the plurality of blocks or the of the plurality of partitions.

4. The method of claim 1, wherein each record of the plurality of records comprises a customer profile.

5. The method of claim 1, wherein the identifying the plurality of partitions corresponding to the selected blocks of the plurality of blocks further comprises identifying, by the computer system, partitions of the plurality of partitions corresponding to the selected blocks of the plurality of blocks that contain over a threshold number of records of the plurality of records.

6. The method of claim 1, wherein the plurality of nodes comprises a cluster connected via a local area network.

7. The method of claim 6, wherein the cluster comprises at least one hundred nodes.

8. The method of claim 7, wherein the plurality of records comprises at least five hundred million records.

9. The method of claim 1, wherein:
    each record of the plurality of records comprises a customer profile; and
    the plurality of records comprises at least five hundred million records.

10. The method of claim 1, wherein:
    the processing comprises comparing records corresponding to the block of the plurality of blocks or the partition of the plurality of partitions;
    the processing further comprises searching for links between records corresponding to the block of the plurality of blocks or the partition of the plurality of partitions;
    each record of the plurality of records comprises a customer profile;
    the plurality of nodes comprises a cluster connected via a local area network;
    the cluster comprises at least one hundred nodes; and
    the plurality of records comprises at least five hundred million records.

11. A computer-implemented method for efficiently comparing a large number of records, the method comprising:
    obtaining, by a computer system, a plurality of records;
    generating a plurality of tuples, each tuple of the plurality of tuples identifying a block key of a plurality of block keys and a corresponding record of the plurality of records;
    grouping portions of the plurality of records into a plurality of blocks according to the plurality of block keys;
    counting, by the computer system, a number of records of the plurality of records corresponding to each block of the plurality of blocks;
    identifying, by the computer system, a plurality of partitions corresponding to selected blocks of the plurality of blocks, the selected blocks of the plurality of blocks contain a disproportionally large number of records of the plurality of records, such that the disproportionally large number of records of the plurality of records is determined by calculating a maximum size of an unpartitioned block of the plurality of blocks by:
        determining a comparison time to compare two records of the plurality of records; and
        determining a threshold time allowed for a processor of the computer system to complete processing;
    distributing, by the computer system, a workload associated with a block of the plurality of blocks or a partition of the plurality of partitions to each node of a plurality of nodes contained within the computer system;
    comparing, in parallel by each node of the plurality of nodes, records corresponding to the block of the plurality of blocks or the partition of the plurality of partitions; and
    linking, by the computer system in view of the comparing, one or more selected records of the plurality of records to one or more other records of the plurality of records.

12. The method of claim 11, wherein each record of the plurality of records comprises a customer profile.

13. The method of claim 11, wherein the identifying comprises identifying, by the computer system, partitions of the plurality of partitions corresponding to the selected blocks of the plurality of blocks that contain over a threshold number of records of the plurality of records.

14. The method of claim 11, wherein the plurality of nodes comprises a cluster connected via a local area network.

15. The method of claim 14, wherein the cluster comprises at least one hundred nodes.

16. The method of claim 15, wherein the plurality of records comprises at least five hundred million records.

17. The method of claim 11, wherein each record of the plurality of records corresponds to a customer.

18. The method of claim 17, wherein the linking comprises linking one or more of the selected records of the plurality of records corresponding to a particular customer or household to one or more other records of the plurality of records that also correspond to the particular customer or household.

19. The method of claim 11, wherein:
   each record of the plurality of records comprises a customer profile;
   the identifying comprises identifying, by the computer system, partitions of the plurality of partitions corresponding to the selected blocks of the plurality of blocks that contain over a threshold number of records of the plurality of records;
   the plurality of nodes comprises a cluster connected via a local area network;
   the cluster comprises at least one hundred nodes;
   the plurality of records comprises at least five hundred million records;
   each record of the plurality of records corresponds to a customer; and
   the linking comprises linking one or more of the selected records of the plurality of records corresponding to a particular customer or household to one or more other records of the plurality of records that also correspond to the particular customer or household.

20. A computer system comprising:
   a plurality of processors;
   one or more memory devices operably connected to one or more processors of the plurality of processors; and
   the one or more memory devices collectively storing:
      a plurality of records;
      a tuple module programmed to generate a plurality of tuples, each tuple of the plurality of tuples identifying a block key of a plurality of block keys and a corresponding record of the plurality of records;
      a group module programmed to group portions of the plurality of records into a plurality of blocks according to the plurality of block keys;
      counting, by the computer system, a number of records of the plurality of records corresponding to each block of the plurality of blocks;
      a plurality of counting modules programmed to count a number of records of the plurality of records corresponding to each block of the plurality of blocks;
      a mapping module programmed to identify a plurality of partitions corresponding to selected blocks of the plurality of blocks, the selected blocks containing a disproportionately large number of records of the plurality of records, such that the disproportionately large number of records of the plurality of records is determined by calculating a maximum size of an unpartitioned block of the plurality of blocks by:
         determining a comparison time to compare two records of the plurality of records; and
         determining a threshold time allowed for a processor of the computer system to complete processing;
      the mapping module further programmed to distribute a workload associated with a block of the plurality of blocks or a partition of the plurality of partitions to each node of a plurality of nodes corresponding to the plurality of processors; and
      a plurality of comparison modules programmed to compare records corresponding to the block of the plurality of blocks or the partition of the plurality of partitions.

21. The computer system of claim 20, wherein the one or more memory devices further collectively store a reduction module programmed to link, in view of comparisons made by the plurality of comparison modules, one or more selected records of the plurality of records to one or more other records of the plurality of records.

* * * * *